United States Patent
Nikitin et al.

(10) Patent No.: US 7,573,677 B2
(45) Date of Patent: Aug. 11, 2009

(54) REDUCTION OF INTERFERENCE PICKUP IN HEADS FOR MAGNETIC RECORDING BY MINIMIZING PARASITIC CAPACITANCE

(75) Inventors: Vladimir Nikitin, Campbell, CA (US); Michael Paul Salo, San Jose, CA (US); Samuel W. Yuan, Saratoga, CA (US); Robert Langland Smith, Sunnyvale, CA (US); Mark Allen Burleson, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 1620 days.

(21) Appl. No.: 10/087,332

(22) Filed: Mar. 1, 2002

(65) Prior Publication Data

US 2003/0165034 A1   Sep. 4, 2003

(51) Int. Cl.
    *G11B 5/60*   (2006.01)
(52) U.S. Cl. .................................. 360/234.5
(58) Field of Classification Search .............. 360/234.3, 360/234.7, 234.5, 322
    See application file for complete search history.

(56) References Cited

U.S. PATENT DOCUMENTS

| | | | | |
|---|---|---|---|---|
| 3,781,486 A | | 12/1973 | Maryatt et al. | ............... 360/120 |
| RE29,326 E | | 7/1977 | Lazzari et al. | ............... 360/123 |
| 4,789,910 A | | 12/1988 | Otsuka et al. | ................ 360/113 |
| 4,807,073 A | * | 2/1989 | Takeura et al. | .......... 360/327.21 |
| 5,001,591 A | * | 3/1991 | Nakashima | .................. 360/126 |
| 5,048,175 A | * | 9/1991 | Jurisch et al. | ............. 29/603.14 |
| 5,122,916 A | | 6/1992 | Aranovsky | .................... 360/124 |
| 5,483,392 A | | 1/1996 | Ishida | ...................... 360/77.03 |
| 5,771,568 A | | 6/1998 | Gustafson | ................ 29/603.03 |
| 5,772,797 A | | 6/1998 | Nakanishi et al. | ............ 148/306 |
| 5,805,390 A | * | 9/1998 | Takeura | ....................... 360/323 |
| 5,820,980 A | | 10/1998 | Asakawa et al. | ............. 428/332 |
| 5,898,548 A | * | 4/1999 | Dill et al. | .................. 360/324.2 |
| 5,923,502 A | * | 7/1999 | Christensen et al. | ......... 360/319 |
| 5,966,800 A | * | 10/1999 | Huai et al. | ................ 29/603.13 |
| 6,034,847 A | | 3/2000 | Komuro et al. | .............. 360/126 |
| 6,122,148 A | * | 9/2000 | Hamaguchi et al. | ....... 360/234.3 |

OTHER PUBLICATIONS

WW Brooks Jr., JB Brown, EA Cunningham, JH Mahanna, "*On-Head Shield for a Hard File Servo Head*", Apr. 1989.

* cited by examiner

*Primary Examiner*—David D Davis
(74) *Attorney, Agent, or Firm*—Kunzler & McKenzie (57) ABSTRACT

Disclosed is a system and a method for reducing high frequency interference pickup by the read element of the magneto-recording head. The reduction is achieved by reducing the parisitic capacitance between certain elements of the magnetic head. In one embodiment, the areas of the pads and leads, including the areas of the leads over the S1 and the areas of the sensor leads, are reduced. A second implementation involves increasing the separation between the pads and leads and the substrate material. Copper studs or vias may be used to connect the contact pads and the underlying layers. A third implementation includes using a low dielectric constant material as a spacer layer between conductors (leads, pads, magnetic shields) and the substrate.

24 Claims, 6 Drawing Sheets

REDUCTION OF INTERFERENCE PICKUP IN HEADS FOR MAGNETIC RECORDING BY MINIMIZING PARASITIC CAPACITANCE

BACKGROUND OF THE INVENTION

1. The Field of the Invention

The invention relates generally to magnetic storage devices. More specifically, the present invention relates to disk drives where data is stored on and retrieved from magnetic media using a read/write head.

2. The Relevant Art

Computer systems generally utilize auxiliary memory storage devices having media on which data can be written and from which data can be read for later use. A direct access storage device, such as a disk drive, incorporating rotating magnetic disks is commonly used for storing data in magnetic form on the disk surfaces. Data is recorded on concentric, radially spaced tracks on the disk surfaces. Magnetic heads carrying read sensors are then used to read data from the tracks on the disk surfaces.

In high capacity disk drives, magnetoresistive read sensors, commonly referred to as MR heads, are commonly used. This is largely due to the capability of MR heads of reading data on a disk of a greater linear density than that which the previously used thin film inductive heads are capable of. An MR sensor detects a magnetic field through a change in resistance in its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another recently developed type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect. In an SV sensor, one of the ferromagnetic layers, referred to as the pinned layer, has its magnetization typically pinned by exchange coupling with an antiferromagnetic (e.g., NiO or Fe—Mn) layer.

The magnetization of the other ferromagnetic layer, referred to as the free layer, however, is not fixed and is free to rotate in response to the field from the recorded magnetic medium (the signal field). In SV sensors, the SV effect varies as the cosine of the angle between the magnetization of the pinned layer and the magnetization of the free layer. Recorded data can be read from a magnetic medium because the external magnetic field from the recorded magnetic medium causes a change in the direction of magnetization in the free layer, which in turn causes a change in resistance of the SV sensor and a corresponding change in the sensed current or voltage. It should be noted that the AMR effect is also present in the SV sensor free layer and it tends to reduce the overall GMR effect.

The disk drive industry has been engaged in an ongoing effort to increase the overall GMR effect while maintaining the highest signal-to-noise ratio possible. As the size of components in the disk drive industry become smaller and more compact, the possibility of noise interference increases dramatically. Prior art disk drives and recent industry efforts have failed to develop adequate methods of increasing the signal-to-noise ratio.

Therefore, it should be apparent that a need exists for a method of minimizing the amount of noise interference present in a disk drive system, thus maximizing the level of signal received.

OBJECTS AND BRIEF SUMMARY OF THE INVENTION

The method of the present invention has been developed in response to the present state of the art, and in particular, in response to the problems and needs in the art that have not yet been fully solved by currently available disk drive systems. Accordingly, it is an overall object of the present invention to provide a disk drive system that overcomes many or all of the above-discussed shortcomings in the art.

The inventor has discovered that electrical noise, present to a certain extent in all disk drives and tape drives, can couple through parasitic components in the head of a disk drive and be amplified by the head electronics, resulting in reduction of the signal-to-noise ratio. This has an adverse affect on the error rate performance. In the case of hard disk drives, the conductive disk surface and the head substrate act in a manner similar to an antenna, picking up ambient radio frequency (RF) energy. External sources of RF energy include radio and TV stations as well as nearby electronic devices. Internal sources of RF energy include the drive motor and drive electronics. The RF interference can propagate into the head through capacitive coupling to various head elements.

An apparatus and method for reducing the high frequency interference pickup by the read element of the magneto-recording head are disclosed. In one embodiment, the objects of the invention are achieved by reducing the capacitance of various head elements.

In one embodiment of the present invention, a reduced capacitance disk drive head comprising an electrical contact pad, a substrate on which the disk drive head is formed, and a low dielectric material interposed between the pad and the substrate are provided.

In a further embodiment, the reduced capacitance disk drive head comprises a stud that is formed through the low dielectric material. The use of the low dielectric material is configured to decrease the parasitic capacitance of the disk drive head. The stud formed through the low dielectric material may comprise the element copper (Cu) or another electric conducting material. The low dielectric material may be configured to comprise a hard bake photo resist. In one embodiment, the low dielectric material may comprise silicon dioxide ($SiO_2$). The low dielectric material is preferably configured to have a dielectric constant of less than about nine. In one embodiment, the low dielectric material has a dielectric constant of about three. The low dielectric material may provide a platform for the electrical contact pad. The reduced capacitance disk drive head is configured in one embodiment to carry a GMR sensor.

The reduced capacitance disk drive head may comprise an electrical contact pad, a substrate on which the disk drive head may be formed, and a low dielectric material interposed between the pad and the substrate. The low dielectric material is configured to be a platform for the electrical contact pad to increase the distance between the substrate and the electrical contact pad. The low dielectric material is also configured to comprise hard bake photo resist.

The reduced capacitance disk drive head in a further embodiment comprises a reduced area pad, a reduced area lead, and a substrate on which the disk drive head is formed. In another embodiment, the reduced capacitance disk drive head comprises an electrical contact pad, an alumina undercoat layer comprising $Al_2O_3$, a substrate on which the disk drive head is formed, and an additional layer of material interposed between the pad and the aluminum undercoat layer, the additional layer comprising alumina. The reduced capacitance disk drive head may also be configured with an additional layer of material interposed between the pad and the aluminum undercoat layer, the additional layer preferably comprising $SiO_2$.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
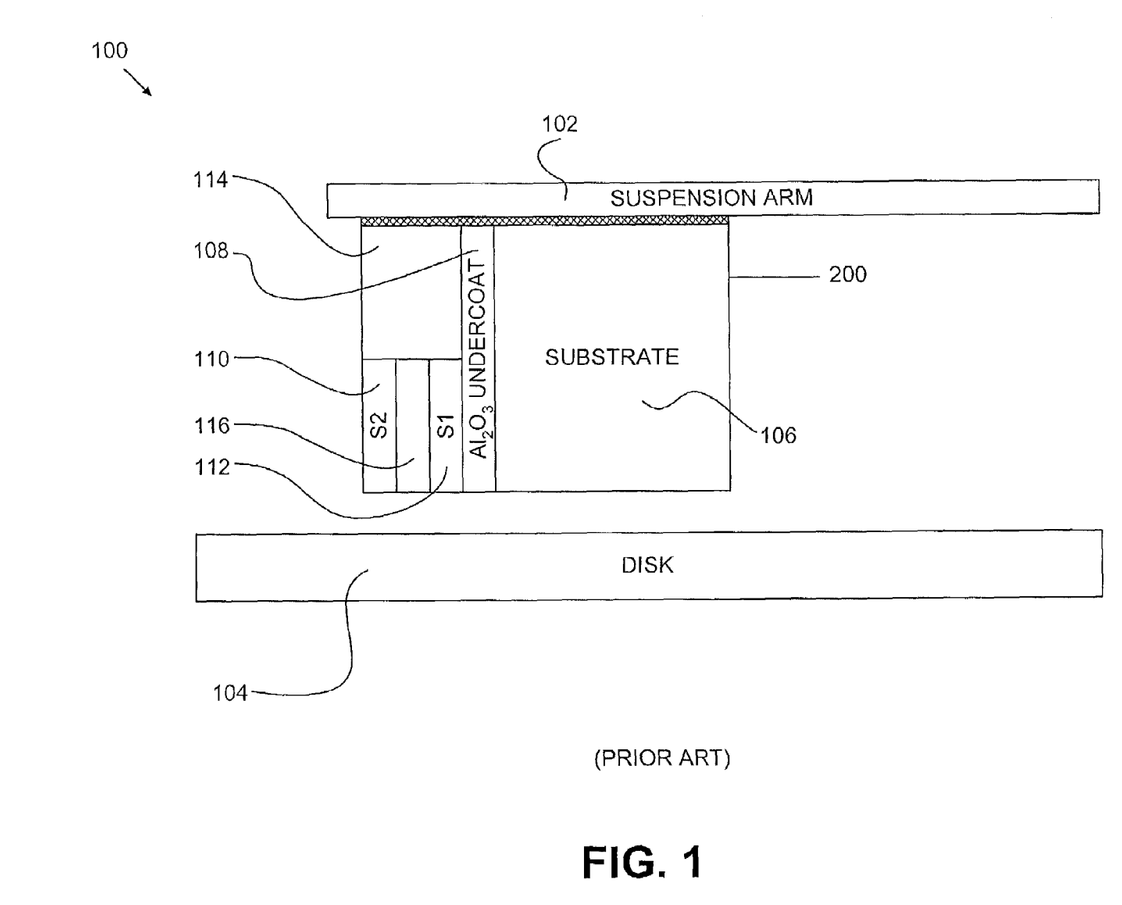
FIG. 1 is a cross-sectional view illustrating the composition of a disk drive head with a suspension arm and a magnetic media disk of the prior art.

FIG. 1 shows a cross-sectional view illustrating the composition of a disk drive assembly 100 of the prior art having a disk drive head 200, a suspension arm 102 and a magnetic media disk 104. Within the disk drive head 200, an electrical pad 114 is shown and a substrate material 106 is also provided and the disk drive head 100 is formed on the substrate material 106. Between the electrical pad 114 and the substrate 106, a dielectric material 108 is interposed. The dielectric material 108 typically comprises $Al_2O_3$. Two shield layers, 112 (S1) and 110 (S2) are then formed on the dielectric material layer 108. The shield layers S1 112 and S2 110 are interposed by a thin electrical pad 116.

Figure 2:
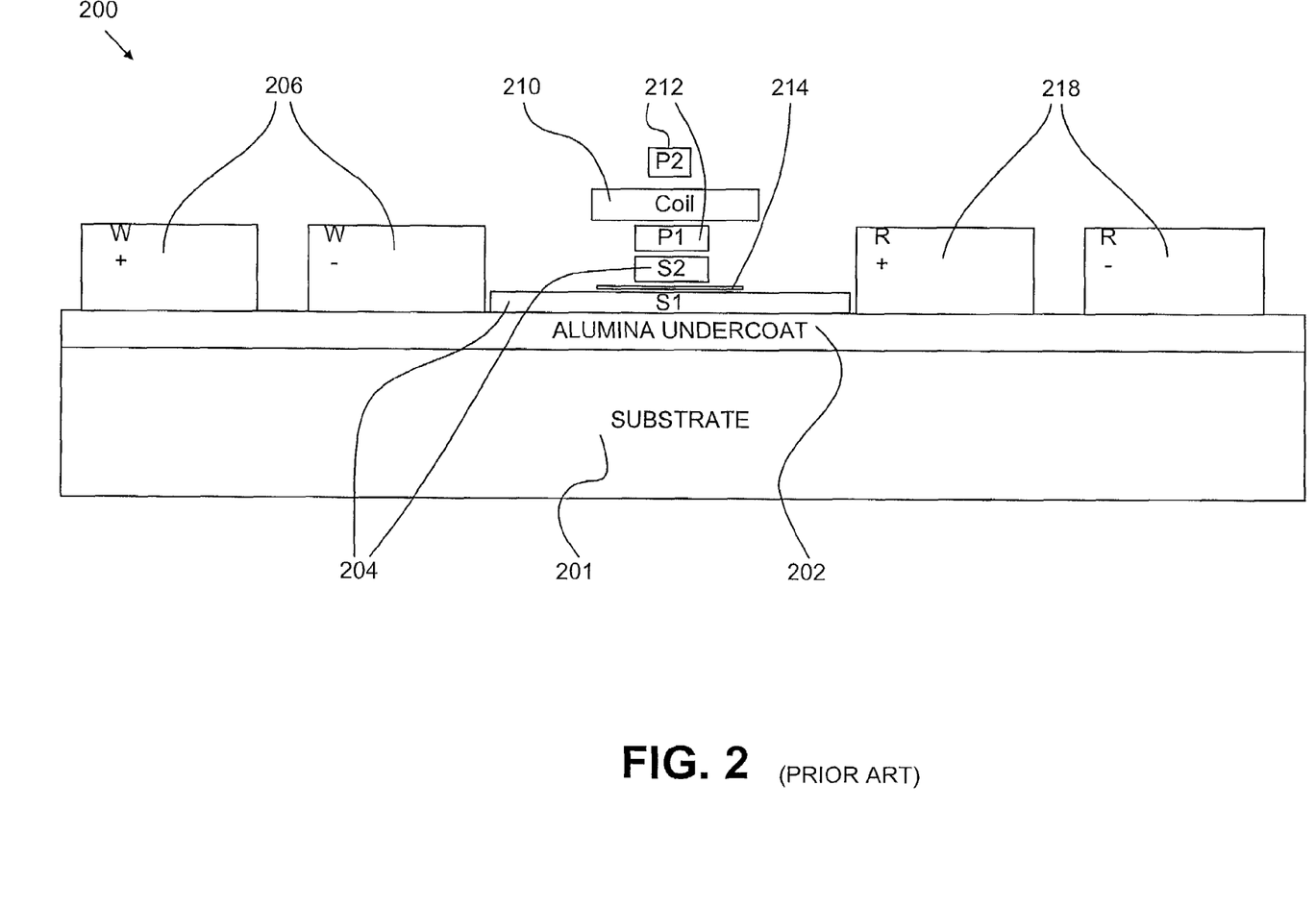
FIG. 2 is a cross-sectional view illustrating the composition of a typical prior art disk drive head for magnetic recording.

FIG. 2 illustrates a cross-sectional view illustrating the composition of the typical disk drive head 200 for magnetic recording of the prior art. The disk drive head 200 is formed on a substrate material 201 which offers stability and support to the disk drive head 200 and the corresponding layers. On top of the substrate 201, an alumina undercoat 202 is typically laid. In one embodiment, the alumina undercoat 202 comprises $Al_2O_3$. The alumina undercoat 202 is formed with a thickness of between about 5 µm and 2 µm, with a preferred thickness of 3.5 µm. Shield layers 204 (S1 and S2) are formed on the alumina undercoat 202. A thin dielectric layer 214 is typically interposed between the shield layers 204. The yoke of the head 200 consists of two pole layers 212 (P1 and P2) which are formed over the shield layers 204. A coil layer 210 is typically interposed between the two pole layers 212. The coil layer 210 is configured to generate magnetic field in the magnetic yoke of the head 200, enabling the writing layers of the head 200 to function. Also formed on the alumina undercoat layer 202 are read contact layers 218 and write contact layers 206. The read contact layers 218 comprise a positive and negative layer. The write contact layers 206 also comprise a positive and negative layer which will be discussed with greater detail in FIG. 6.

Figure 3:
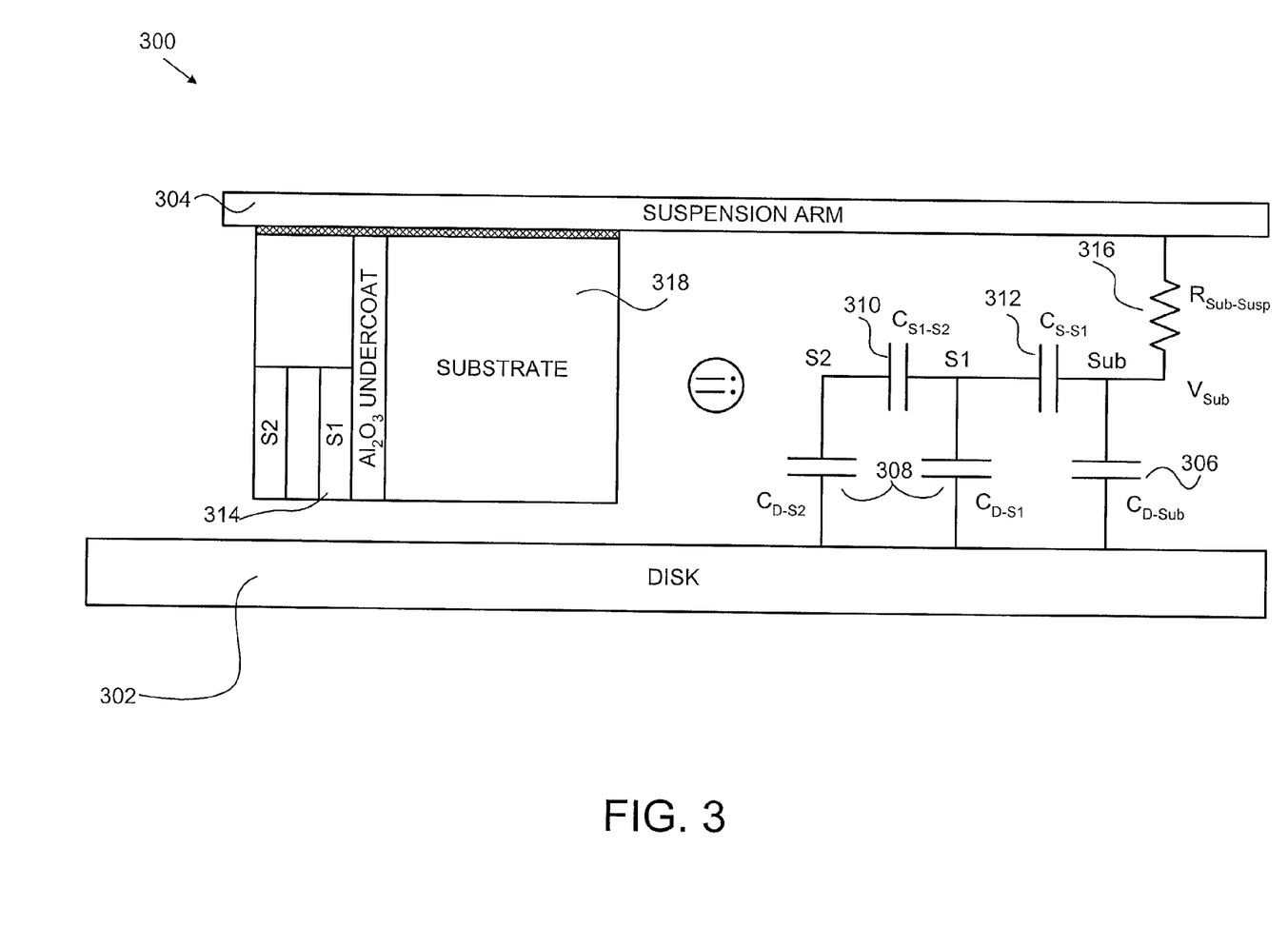
FIG. 3 is a schematic circuit diagram showing the equivalent impedance between the magnetic disk and the suspension arm.

FIG. 3 is a schematic circuit diagram 300 showing the equivalent impedance between the magnetic disk 302 and the suspension arm 304. The inventors have found radio frequency noise can propagate into the head by capacitive coupling ($C_{D-Sub}$) 306 between the disk 302 and the conductive head substrate 318, capacitive coupling ($C_{D-S1}$, $C_{D-S2}$) 308 between the magnetic disk 302 and the magnetic shields 314, or capacitive coupling through any other conductor in the head 300 forming a capacitive coupling with the disk surface 302. Other capacitive coupling discovered by the inventors and depicted in FIG. 3 include shield capacitance 310 ($C_{S1-S2}$) and substrate to shield capacitance 312 ($C_{S-S1}$). The value of the capacitance is proportional to the area of the conductive element, and is inversely proportional to the separation between the two conductors. The following equation provides a good approximation for calculating the capacitance between the relative conductive surfaces of the different capacitances depicted in FIG. 3.

$$C = \epsilon\epsilon_0(\text{Area}/d) \quad \text{(Eq. 1)}$$

Where $\epsilon_0 = 8.85 \times 10^{-12}$ $coul^2/Nm^2$, $\epsilon$ is the dielectric constant of the separating gap, A is the area, and d is the distance between the conductors. The capacitance values of the capacitors shown in FIG. 3 will depend on the head design, including factors like the shield area 314 (S1) at the ABS, fly height, air bearing, etc. For a typical head, the largest capacitance is formed by the conductive slider substrate 306 and the disk 302, with values of the conductive substrate 306 ranging from $C_{D-Sub}$=20 to 500 pF. The slider substrate 306 must be well grounded through the suspension 304, and the resistance 316 ($R_{Sub-Susp}$) must be extremely low, so as to prevent most of the electric interference from the disk 302 to be transmitted into the slider 306. From the slider substrate 306, the signal can then propagate into the read element through a number of elements.

Figure 4:
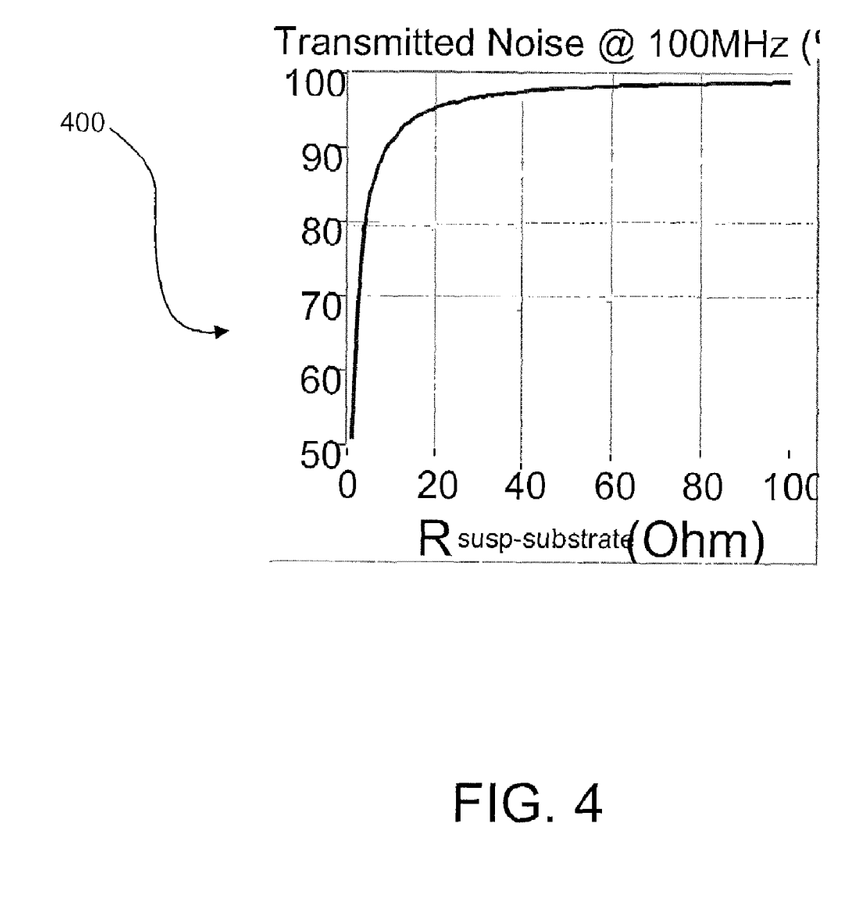
FIG. 4 is a chart illustrating the relationship between the RF interference and the resistance from the substrate to the suspension arm.

Referring now to FIG. 4, illustrated therein is the relationship between the RF interference and the resistance from the substrate 318 to the suspension arm 304 of FIG. 3. FIG. 4 illustrates the relationship of the interference transmitted into the slider as a function of $R_{Sub-Susp}$ at 100 MHz for $C_{D-Sub}$=500 pF according to the equation:

$$V_{Sub}=V_{Disk}(R_{Sub-Susp}/R_{Sub-Susp}+(1/jwC_{D-Sub})) \quad \text{(Eq. 2)}$$

As can be seen from the chart 400, as the value of $R_{Sub-Susp}$ is increased, the transmitted noise in the head is increased dramatically.

Figure 5:
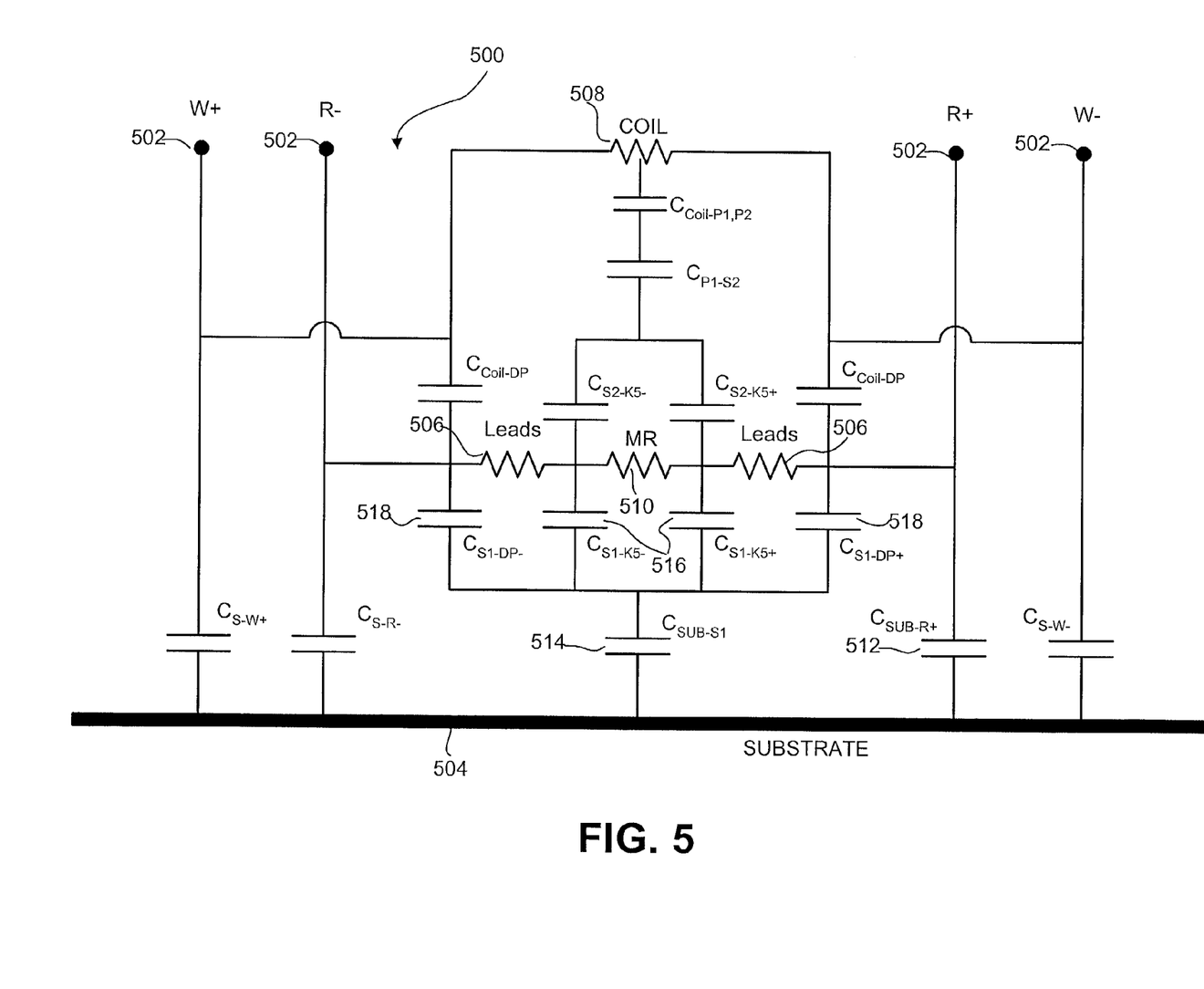
FIG. 5 is a schematic circuit diagram showing the equivalent impedance between the electrical contact pads and the substrate.

FIG. 5 is a schematic circuit 500 showing the equivalent impedance between the electrical contact pads 502 and the substrate 504. As seen in FIG. 5, there are numerous capacitances through which the interference, picked-up by the slider substrate 504 can couple into the read element 502. The interference level can be calculated, and in the case of the single-ended amplifier, is given by the following equation:

$$V_{MR} = V_{Sub} \frac{R_{MR}}{R_{MR} + \frac{1}{jwC_{MR-Sub}}} \quad \text{(Eq. 3)}$$

In the above mentioned equation, $C_{MR-Sub}$ is given by the equation below, assuming that $R_{SENSOR\,LEADS}$ 506, $R_{Coil}$ 508, and $R_{MR}$ 510 are relatively small.

$$C_{MR-Sub} = C_{Sub-R+} + \left(\frac{1}{C_{Sub-S1}} + \frac{1}{C_{S1-K5} + C_{S1-Dp}}\right)^{-1} + \left(\frac{1}{C_{Sub-W-}} + \frac{1}{C_{Coil-Dp+} + \left(\frac{1}{C_{Coil-P1} + C_{Coil-P2}} + \frac{1}{C_{P1-K5+}}\right)^{-1}}\right)^{-1} \quad \text{(Eq. 4)}$$

In equation 4, the capacitance 512 indicated by the term, $C_{Sub-R+}$ is the contribution from coupling between the read pads 502 and the substrate 504. Further capacitances 514, 516, and 518, indicated by the terms $C_{Sub-S1}$ and $C_{S1-SENSOR\,LEADS}$, and $C_{S1-Dp}$ respectively, result from coupling through the write pads 502 into the coil 508 and from shields into MR leads. The highest contributors to the capacitive pickup are the magnetic shield 1 (S1) 314, (of FIG. 3) and the MR pads 510, while coupling through the coil 508 has a second order effect. For a typical head design, the calculated voltage, picked up into the read element 502 of the head 500, constitute 1-5% of the interference present in the drive 500.

Figure 6:
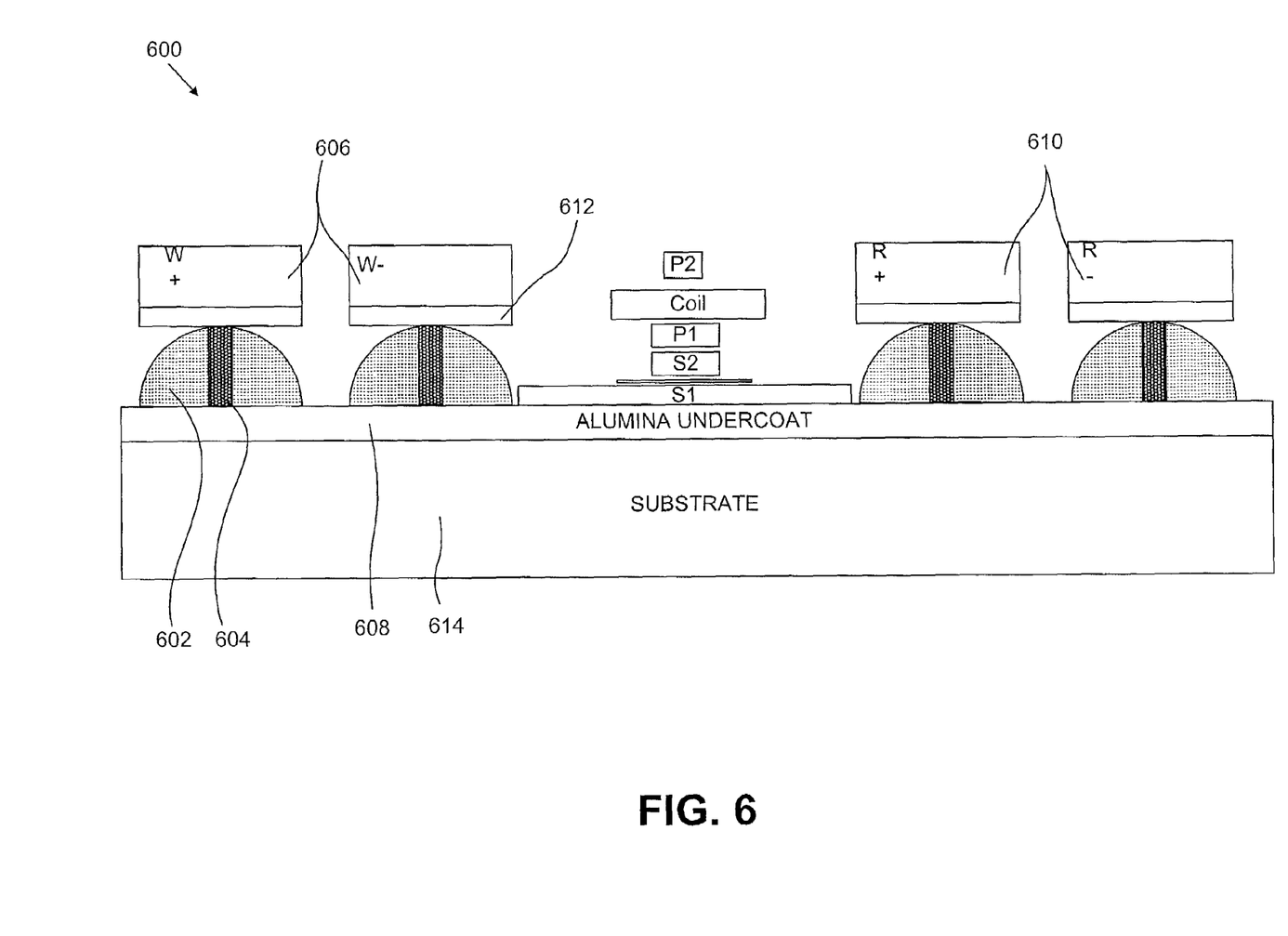
FIG. 6 is a cross-sectional view of a disk drive head illustrating the low dielectric material and studs interposed between the electrical contact pads and the alumina undercoat of the present invention.

FIG. 6 is a cross-sectional view of a typical disk drive head 600 illustrating several manners under the present invention of reducing parasitic capacitive coupling. The present invention includes three embodiments designed to reduce the high frequency interference pickup by the read element 610 of the magneto-recording head by reducing the capacitance of various head elements. In one embodiment, the area of the contact pads 610 is reduced. The contact pads 610 that connect to the GMR sensor are reduced to a minimal surface area, that in one embodiment is less than about 20 μm, and in a more preferred embodiment is about 10 μm. Preferably, the contact pads 610 are covered with photoresist and hard baked. The photoresist is left on as an insulator. The contact pads 610 are also preferably connected by studs 604 to an alumina undercoat 608 that rests on the substrate 614 from which the contact pads 610 are to be isolated in order to reduce parasitic capacitance. The studs 604 suspend the contact pads 610 through a small hole or "via" that is preferably filled with a conducting material. Copper is preferred. The suspension of the contact pads 610 allows the area of these contact pads 610 to be reduced, thus reducing parisitic capacitance coupling.

A second embodiment of the present invention is designed to reduce high frequency interference by increasing the separation between the contact pads 610 and the substrate material 614. One example of a manner of achieving a greater separation between the contact pads 610 and the substrate material 614 is to increase the thickness of the alumina undercoat 608. The layer of alumina undercoat 608 is deposited prior to the S1 layer 314 (seen in FIG. 3). A thickness of between about 20 to about 30 microns is preferably deposited, whereas prior art thicknesses have been about 3.5 μm to about 5 μm. The alumina undercoat 608 preferably comprises $Al_2O_3$, but may also comprise silicon oxide ($SiO_2$).

The thick layer of the alumina undercoat 608 increases the distance between the contact pads 610 and substrate material 614, which leads to a reduction in high frequency interference picked up by the read elements 610.

A third embodiment of the present invention comprises suspending the contact pads 610 on studs 604 as described previously, and using a material 602 having a low dielectric constant as a spacer layer between the contact pads 610 and the substrate 614. Under this embodiment, the need to increase the thickness of the alumina undercoat 608 may be eliminated. An increase in the thickness of the alumina undercoat 608 is less preferred, as it may introduce stress in the film and create a delimitation from the substrate material 614. The low dielectric material 602 preferably has a dielectric constant less then about 10 and a more preferably dielectric constant of about 3. An example of a low dielectric material 602 placed as a spacer between the contact pads 610 and the substrate 614 comprises silicon dioxide, which has a dielectric constant of about 3. FIG. 6 depicts a hard photoresist encapsulating the studs 604 and is used as a platform for the contact pads 610. The small area of the studs 604 leads to a small capacitance to the substrate 614, while the area of the contact pads 610 is separated from the substrate 614 by a low dielectric material 602, leading to a small overall capacitive coupling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A magnetic head comprising:
    an electrical contact pad;
    a substrate on which the magnetic head is formed;
    an insulating undercoat interposed between the pad and the substrate; and
    a material selected to have a low dielectric constant substantially fully interposed between the pad and the insulating undercoat and conducting stud formed through the low dielectric material to make an electrical connection between the electrical contact pad and the insulating undercoat.

2. The magnetic head of claim 1, wherein the low dielectric material is configured to decrease the parasitic capacitance of the magnetic head.

3. The magnetic head of claim 1, wherein the stud comprises Cu.

4. The magnetic head of claim 1, wherein the stud comprises a conductive material.

5. The magnetic head of claim 1, wherein the low dielectric material comprises hard-bake photo resist.

6. The magnetic head of claim 1, wherein the low dielectric material comprises $SiO_2$.

7. The magnetic head of claim 1, wherein the low dielectric material has a thickness in a range of between about 1 μm and about 100 μm.

8. The magnetic head of claim 1, wherein the low dielectric material has a thickness in a range of between about 10 μm and about 50 μm.

9. The magnetic head of claim 1, wherein the low dielectric material has a thickness of about 20 μm.

10. The magnetic head of claim 1, wherein the low dielectric material has a dielectric constant of less than about 9.

11. The magnetic head of claim 1, wherein the low dielectric material has a dielectric constant of about 3.

12. The magnetic head of claim 1, wherein the magnetic head carries a GMR sensor.

13. The magnetic head of claim 1, wherein the low dielectric material provides a platform for the electrical contact pad.

14. The magnetic head of claim 1, further comprising an electrical contact pad having a surface area of less than about 20 μm in order to reduce capacitance coupling with the substrate.

15. A reduced capacitance magnetic head comprising:
an electrical contact pad;
a substrate on which the magnetic head is formed;
an insulating layer formed over the substrate;
a low dielectric material substantially full interposed between the pad and the substrate which is used as a platform for the electrical contact pad to increase the distance between the substrate and the electrical contact pad, the low dielectric material comprising hard bake photo resist and having a thickness of about 20 μm and a dielectric constant of about 3; and
a conducting stud formed through the low dielectric material to make electrical connection between the electrical contact pad and the insulating layer.

16. A disk drive system, comprising:
a reduced capacitance magnetic head comprising:
an electrical contact pad;
a substrate on which the magnetic head is formed;
an insulating undercoat substantially fully interposed between the pad and the substrate;
a material selected to have a low dielectric constant interposed between the pad and the insulating undercoat and conducting stud formed through the low dielectric material to make an electrical connection between the electrical contact pad and the insulating undercoat;
a magnetic recording disk;
a spin-valve sensor for reading data recorded on the recording disk; and
an actuator for moving the spin valve sensor across the magnetic recording disk in order for the spin-valve sensor to access different magnetically recorded data on the magnetic recording disk; and
a detector electrically coupled to the spin-valve sensor and configured to detect changes in resistance of the sensor caused by rotation of the magnetization of the sensing layer relative to the fixed magnetizations of the pinned layer in response to changing magnetic fields induced by the magnetically recorded data.

17. The disk drive system of claim 16, further comprising a stud formed through the low dielectric material.

18. The disk drive system of claim 16, wherein the low dielectric material is configured to decrease the parasitic capacitance of the magnetic head.

19. The disk drive system of claim 16, wherein the low dielectric material has a thickness in a range of between about 10 μm and about 50 μm.

20. The disk drive system of claim 16, wherein the magnetic head comprises a GMR sensor.

21. A reduced capacitance magnetic head comprising:
a substrate on which the magnetic head is formed;
a contact pad disposed above the substrate and having a surface area less than about 20 μm in order to reduce capacitance coupling with the substrate a material selected to have a low dielectric constant substantially fully interposed between the pad and the insulating under coat and a conducting stud formed to make an electrical connection between the contact pad and an insulating layer interposed between the pad and the substrate.

22. A magnetic head comprising:
a substrate on which the magnetic head is formed;
an alumina undercoat layer comprising $Al_2O_3$ formed over the substrate;
an electrical contact pad;
a layer of alumina substantially fully interposed between the electrical contact pad and the alumina undercoat layer and conducting stud formed through the layer of alumina to make an electrical connection between the electrical contact pad and the alumina undercoat layer.

23. A magnetic head comprising:
a substrate on which the magnetic head is formed;
an insulating undercoat layer comprising $SiO_2$ formed over the substrate;
an electrical contact pad; and
a layer of $SiO_2$ substantially fully interposed between the electrical contact pad and the insulating undercoat layer and conducting stud formed through the layer of SiO2 to make an electrical connection between the electrical contact pad and the insulating undercoat layer.

24. A method of reducing capacitance in a magnetic head, comprising:
providing a substrate;
providing an insulating layer directly over the substrate;
providing a read/write head;
providing a material selected to have a low dielectric constant substantially fully interposed between the read/write head and the insulating layer for isolating the read/write head from the substrate in order to reduce the capacitance coupling between the read/write head and the substrate and providing a conducting stud formed through the low dielectric material to make an electrical connection between the read/write head and the insulating layer.

* * * * *